United States Patent

Kardash

Patent Number: 5,990,656
Date of Patent: Nov. 23, 1999

[54] FREQUENCY DETECTOR

[75] Inventor: John J. Kardash, Gilroy, Calif.

[73] Assignee: Quantum Corporation, Milpitas, Calif.

[21] Appl. No.: 09/187,858

[22] Filed: Nov. 6, 1998

[51] Int. Cl.⁶ .................................................. H02P 5/28
[52] U.S. Cl. .................. 318/807; 318/437; 318/607; 318/798; 318/778; 388/911; 360/75
[58] Field of Search .................................. 318/437, 607, 318/807, 798, 778; 360/75; 388/911

[56] References Cited

U.S. PATENT DOCUMENTS

| | | | |
|---|---|---|---|
| 4,409,533 | 10/1983 | Kawabata | 318/807 |
| 4,495,474 | 1/1985 | Nishikawa et al. | 360/75 |
| 5,384,675 | 1/1995 | Crawforth et al. | 360/75 |
| 5,729,118 | 3/1998 | Yanagisawa et al. | 360/75 |

*Primary Examiner*—Karen Masih
*Attorney, Agent, or Firm*—Michael Zarrabian

[57] ABSTRACT

A frequency detector for a PLL controller, the controller being for generating an output signal to control a motor driver electrically connected to a motor having multiple phase windings arranged as a stator and a rotor having a permanent magnet or a DC current excitation winding for rotating the rotor, the motor driver selectively establishing current paths through selected windings in response to said output signal, to provide maximum torque to the rotor based on the rotational position of the rotor relative to the windings, the frequency detector comprising a monitor for detecting a number of pulses in said output signal during a time period between a first and a second rotational position of the rotor relative to the windings and a governor for generating a frequency control signal as a function of said number of pulses, wherein the PLL controller generates said output signal at output frequencies selectively as a function of said frequency control signal, whereby the frequency detector minimizes a difference between the frequency of the output signal and a corresponding rotational frequency of the rotor.

27 Claims, 7 Drawing Sheets

FREQUENCY DETECTOR

FIELD OF THE INVENTION

The present invention relates generally to commutating data disk spindle motors, and in particular, to commutating data disk spindle motors using a phase lock loop controller.

BACKGROUND

A typical disk drive includes a spindle motor for rotating a data disk, and an actuator for moving a head carrier that supports read/write heads radially across the disk to access data stored on concentric data tracks on the disk. A spindle motor can be a brush less DC motor having multiple phase windings arranged as a stator, and a rotor having a permanent magnet for rotating the disk. During an acceleration phase, the motor is commutated to start from standstill and accelerate to its operational speed. Thereafter, the motor is commutated to maintain that operational speed, by sequentially energizing appropriate phase windings based on the location of the rotor relative to the phase windings. The energized windings generate torque inducing magnetic fields relative to the rotor magnet that rotate the rotor.

In order to ensure that proper phase windings are energized, indirect or sensorless position detection systems, such as back electromotive force ("back emf") detectors, are utilized to determine the rotor position relative to the windings. Back emf detectors sense back emf transitions in the phase windings, due to magnetic flux caused by a moving rotor, to identify the proper phase windings to be energized. Specifically, when the rotor is moving, the change in the course and direction of the magnetic field lines emanating from the rotor magnet causes a magnetic flux through the stator windings, inducing a current in the stator windings. The current induced in the stator windings is a function of the rotor speed or the frequency of magnetic transitions in the stator windings due to the magnetic flux through the stator windings. The induced current develops back emf voltages across resistors electrically connected in series with the phase windings, wherein the back emf voltages provide rotor position information. Once the rotor position is determined, the motor is commutated by sequentially energizing appropriate windings to provide maximum torque to the rotor.

The timing of the commutations is synchronized with back emf transitions in a phase lock loop ("PLL") controller. A conventional PLL controller typically comprises a multiplexer switch, a phase detector, a filter capacitor and a voltage control oscillator ("VCO") for generating commutation timing signals. The multiplexer switch, coupled to the phase detector, sequences back emf voltages from the windings such that only voltages from windings in the unrecognized ("off") state are processed by the phase detector. The phase detector converts the voltages to signals or currents to charge or discharge the filter capacitor depending on whether the voltages are above or below a motor center tap. In effect, the voltages are integrated relative to the center tap. The VCO then generates an output signal at a frequency proportional to the voltage across the filter capacitor. The output signal is used as a clock signal for timing the commutations, whereby the PLL controller keeps the commutation frequency in phase with the electrical cycles of the motor.

A disadvantage of conventional PLL controllers, however, is that they can lock onto a harmonic of the motor frequency rather than the actual motor frequency. For example, a conventional PLL controller can mistakenly lock on to a harmonic of the motor frequency such that the PLL controller produces commutation timing for a harmonic frequency twice that of the actual motor frequency. As a result, although the commutation and motor frequencies are in phase, the frequency of the commutations does not match the frequency of the electrical cycles of the motor.

To solve this problem some PLL controllers further include a frequency detector to detect the frequency of the motor in coast mode and generate a signal causing the VCO to vary the commutation frequency, until the commutation and motor frequencies match. The frequency detector is electrically connected to the motor coils to detect the start of an electrical cycle of the motor, and to the VCO to detect the start of a commutation cycle. Upon detecting the start of an electrical cycle, the frequency detector signal causes the charge pump to charge the filter capacitor and the VCO increases the commutation frequency in response. And upon detecting the start of a commutation cycle, the frequency detector signals the charge pump to discharge the capacitor and the VCO decreases the commutation frequency in response. This process continues until an electrical cycle of the motor and a corresponding commutation cycle occur at the same time.

The frequency detector depends on using the time difference between the start of an electrical cycle and the start of a commutation cycle as the phase error therebetween. The time difference creates a voltage difference at the charge pump causing an incremental change in the frequency of VCO output signal to move the start of a commutation cycle closer to the start of an electrical cycle. By subsequent charge and discharges of the filter capacitor the phase error between the motor frequency and commutations are reduced to a small error. The frequency detector then hands over commutation to the phase detector to keep the commutation frequency in phase with the motor frequency. As such, the PLL controller can generate commutation timing in phase with, and at the same frequency as, the motor.

However, a major disadvantage of PLL controllers with conventional frequency detectors is the inability of such detectors to diminish the phase error between the commutation and motor frequencies for a full range of motor frequencies in minimum time. A mathematical model of the phase error in such controllers can be represented by the following equation wherein the resulting phase error is calculated for (n+1) number of electrical cycles:

$$t(n+1) = \Delta t(n) - (K1*V)*(K2/V)*\sum_{0}^{n} \Delta t(i)$$

OR $$t(n+1) = \Delta t(n) - Tt*(K2/V)*\sum_{0}^{n} \Delta t(i)$$

Wherein, K1 is the rate at which the VCO output frequency changes with the VCO input voltage (VCO Gain), K2 is the voltage change at the filter capacitor during the time of charging (Charge Gain), $\Delta t(i)$ is the phase error at the ith cycle, V is the starting voltage of the charge pump, and Tt is the period of an electrical cycle of the motor. As such, the rate of reduction in the phase error is controlled by the VCO Gain K1 and by the Charge Gain K2. For each set of K1 and K2 values the phase error can be reduced to a very small error for only a limited motor frequency range. This is because, conventional frequency detectors depend on using the time interval between the beginning of an electrical cycle and the beginning of a commutation cycle as a measure of phase error. Therefore, the frequency detector can overshoot in minimizing the time difference, and the phase error will oscillate in one direction rather than to the other, for a certain range of frequencies.

This shortcoming is evident from numerical solutions to the above equation for high and low motor frequency ranges. In each case below, the phase error is 10% of an electrical cycle. For parameter values of K1=100 Hz/V, K2=0.1/sec, Tt=1 msec, and Δt(0)=0.1 msec, the phase error is reduced from 0.1 msec to about 5 μsec in about 20 electrical cycles lasting 20 msec. As such, for a high motor speed of about 7200 revolutions per minute ("rpm") in an 8 pole spindle motor, the phase error is reduced to a small value in a bout 20 msec. However, for parameter values of K1=100 Hz/V, K2=0.1/sec, Tt=5 msec, and Δt(0)=0.5 msec, the phase error is reduced from 0.5 msec to about 100 μsec in about 90 electrical cycles lasting 450 msec, and continues to oscillate at that value thereafter for several hundred msec. As such, the phase error settles to a small value relatively quickly for high motor speeds ranging from about 4200 rpm to about 7000 rpm, but fluctuates greatly for an extended period of time for low motor speeds ranging from about 100 rpm to about 4200 rpm.

A major disadvantage of such a shortcoming is that a conventional PLL controller cannot be reliably used to "hot start" a spindle motor after loss of power. When there is a power interruption, the motor enters a "coast" mode wherein the inertial momentum of the rotor keeps the rotor spinning until friction or breaking bring the rotor to a stop. The motor speed can range from 300 rpm to 7200 rpm depending on the length of the power interruption. Due to the power loss the phase detector in the PLL controller loses track of the motor frequency and must rely on the frequency detector to detect the proper motor frequency before the phase detector can take over and commutate the motor back to its operational speed. In many applications it is crucial to "hot start" the motor after power is restored by commutating the motor back to its operational speed as quickly as possible. However, due to the limited dynamic range of conventional frequency detectors, existing PLL controllers cannot commutate the motor back to its operational speed in minimum time for the full range of frequencies which a motor can experience. As such, either the motor must be brought to a complete stop and restarted again or an entire processing system must idle while the PLL controller attempts to commutate the motor properly.

There is, therefore, a need for a frequency detector for a PLL controller capable of reliably detecting motor frequencies for a full range of motor speeds in minimum time.

SUMMARY

The present invention satisfies these needs. In one embodiment, the present invention provides a frequency detector for a PLL controller, the PLL controller generating an output signal to a motor driver for commutating a spindle motor, wherein the frequency detector minimizes a difference between the frequency of the output signal and a corresponding rotational frequency of the motor in minimum time. Generally, a spindle motor includes multiple phase windings arranged as a stator and a rotor having a permanent magnet or a DC current excitation winding for rotating the rotor. The motor driver selectively establishes current paths through selected windings in response to said output signal, to provide maximum torque to the rotor based on the rotational position of the rotor relative to the windings.

The frequency detector comprises a monitor for detecting a number of pulses in the output signal of the PLL controller during a time period between a first and a second rotational position of the rotor relative to the windings. The frequency detector further comprises a governor for generating a frequency control signal as a function of the detected number of pulses, whereby the PLL controller generates said output signal at output frequencies selectively in response to, and as a function of, the frequency control signal. The frequency detector generates the frequency control signal to maintain the counted number of pulses in the output signal within a predefined range to minimize a difference between the frequency of the output signal and a corresponding rotational frequency of the rotor. The first and the second rotational positions of the rotor can define an electrical cycle of the motor, and in a motor having four electrical cycles per mechanical revolution of the rotor, the predefined range can be from five to seven pulses.

The PLL controller includes a phase detector for minimizing a phase difference between the frequency of the output signal and a corresponding rotational frequency of the rotor. The phase detector monitors a rotational position of the rotor relative to the windings and provides a phase control signal as a function of the rotational position of the rotor. The PLL controller generates said output signal at output frequencies selectively in response to, and as a function of, said phase control signal. The frequency detector can be further responsive to a mode signal having a frequency state and a phase state wherein the frequency detector generates the frequency control signal when the mode signal is in the frequency state, and the phase detector generates the phase control signal when the mode signal is in the phase state. The frequency detector can include means for toggling the mode signal to the phase state when the detected number of pulses in the output signal is within the predefined range. The PLL controller can further include means for toggling the mode signal to the frequency state when the motor enters a coast mode.

In another embodiment, the present invention provides a PLL controller for generating an output signal to control a motor driver for commutating a spindle motor. The PLL controller comprises: (a) a charge pump for generating an output current at one or more current levels in response to input control signals; (b) a capacitor means coupled to the charge pump for receiving said output current and generating a reference voltage at a voltage level relative to amount of charge stored in the capacitor means; (c) a phase detector coupled to the charge pump and responsive to back emf voltage in one or more motor windings, for detecting a rotational position of the rotor relative to the windings and generating a phase control signal to cause the charge pump to generate said output current at a current level as a function of said rotational position of the rotor; (d) a voltage controlled oscillator coupled to the capacitor means for generating said output signal at output frequencies as a function of the voltage level of said reference voltage, and (e) a frequency detector coupled to the charge pump and responsive to back emf voltages in the windings and to said output signal, the frequency detector comprising a monitor for detecting a number of pulses in said output signal during a time period between a first and a second rotational position of the rotor relative to the windings, and a governor for generating a frequency control signal to cause the charge pump to generate said output current at a current level as function of said number of pulses.

The frequency detector generates the frequency control signal to cause the charge pump to charge or discharge the capacitor means in order to maintain said number of pulses in the output signal within a predefined range, thereby minimizing a difference between the frequency of the output signal and a corresponding rotational frequency of the rotor. The phase detector and the frequency detector can be further responsive to a mode signal described above, wherein the phase detector generates the phase control signal when the mode signal is in the phase state and the frequency detector generates the frequency control signal when the mode signal is in the frequency state. As such, when the mode signal is in the phase state, the phase detector can regulate the frequency of said output signal by controlling said reference voltage via charging and discharging of the capacitor means through the charge pump. Further, when the mode signal is in the frequency state, the frequency detector can regulate the frequency of said output signal by controlling said reference voltage via charging and discharging of the capacitor means through the charge pump. The frequency detector can include means for toggling said mode signal to the phase state when said number of pulses in the output signal is within said predefined range. The PLL can further include means for toggling said mode signal to the frequency state when the motor enters a coast mode.

In another aspect, the present invention provides a method of controlling the frequency of an output signal provided by a PLL controller to a motor driver for commutating a spindle motor. The method comprises the steps of: (a) detecting a number of pulses in said output signal during a time period between a first and a second rotational position of the rotor relative to the windings, and generating a frequency control signal as function of said number of pulses; and (b) generating said output signal at output frequencies selectively as a function of said frequency control signal. The frequency control signal minimizes a phase difference between the frequency of the output signal and a corresponding rotational frequency of the rotor. Generating the output signal in step (b) can comprise: (1) generating an output current at one or more current levels in response to said frequency control signal; (2) generating a reference voltage at a voltage level relative to the current level of said output current; and (3) generating said output signal at output frequencies as a function of the voltage level of said reference voltage.

The method of the present invention can further comprise the steps of: (i) generating the frequency control signal to maintain said number of pulses in the output signal within a predefined range, thereby minimizing a difference between the frequency of the output signal and a corresponding rotational frequency of the rotor, (ii) toggling the aforementioned mode signal to the phase state when said number of pulses in the output signal is within said predefined range and (iii) when the mode signal is in the phase state, detecting a rotational position of the rotor relative to the windings and providing a phase control signal as a function of said rotational position of the rotor. The step of generating said output signal further comprises generating said output signal at output frequencies selectively as a function of said frequency or said phase control signals, to minimize a phase difference between the frequency of the output signal and a corresponding rotational frequency of the rotor.

DRAWINGS

These and other features, aspects and advantages of the present invention will become better understood with regard to the following description, appended claims and accompanying drawings where:

DESCRIPTION

Figure 1:
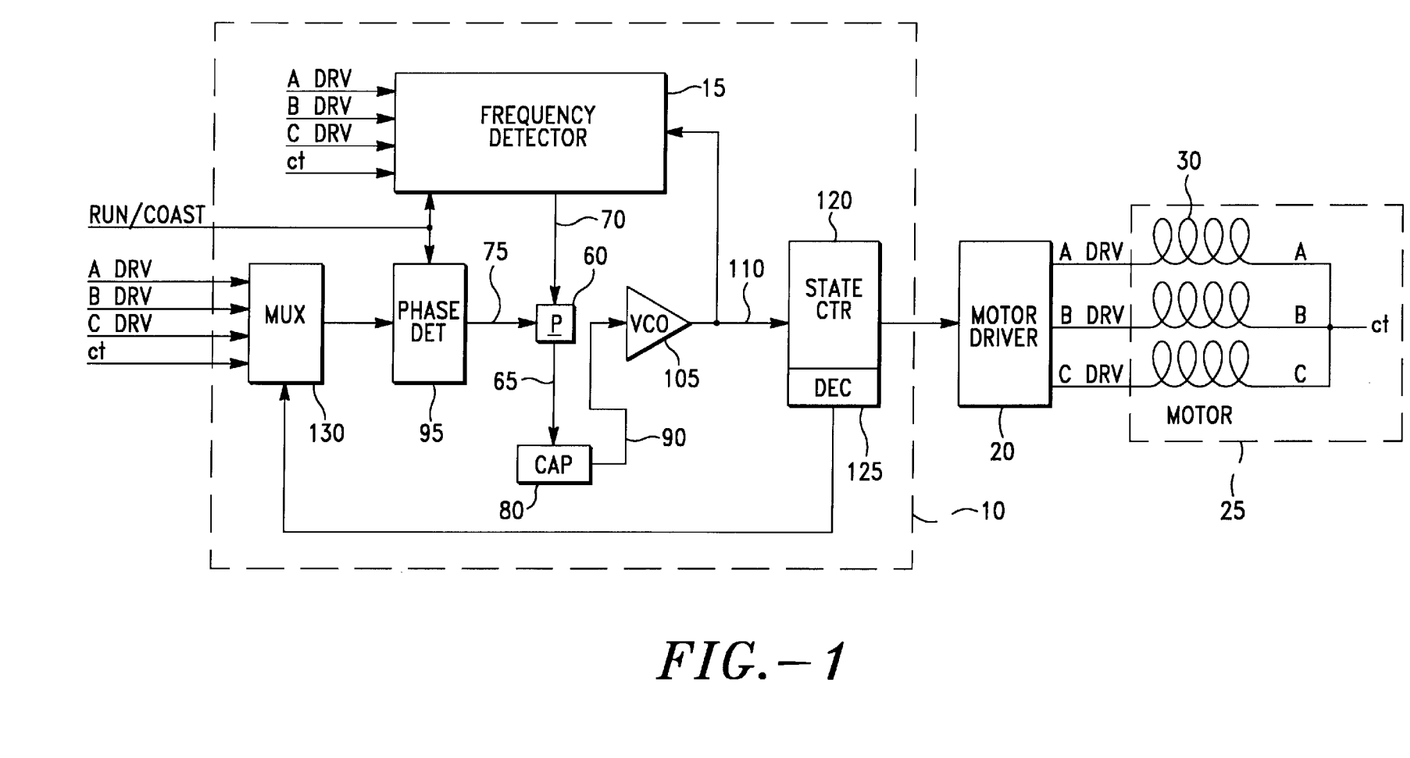
FIG. 1 shows a block diagram of a PLL controller according to the present invention.
Figure 2:
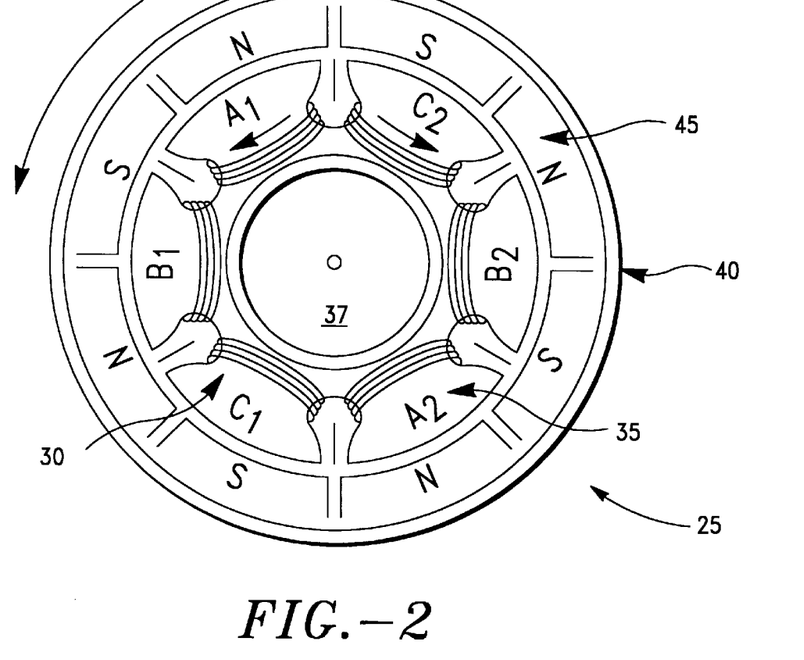
FIG. 2 shows a simplified schematic diagram of an example spindle motor.

FIG. 1 shows a block diagram of a PLL controller 10 in which a frequency detector 15 according to the present invention is electrically coupled. The PLL controller 10 is electrically connected to a motor driver 20 which in turn is electrically connected to a spindle motor 25. The PLL controller 10 provides a timing output signal to the motor driver 20 to optimally commutate the motor 25 as described further below. Referring to FIG. 2, an example spindle motor 25 comprises a brush less DC motor having three phase windings 30 arranged as a stator 35, and a rotor 40 comprising a magnet 45. The phase windings 30 are positioned in a fixed base casting 37, and the rotor 40 is rotatably disposed in the base casting 37. The magnet 45 can include a permanent magnetic ring with eight north and south poles magnetized therein alternately. Alternatively, the magnet 45 can comprise a DC excitation winding including a set of windings positioned on the rotor 40 such that currents applied to the excitation windings create north and south poles alternately.

Figure 3:
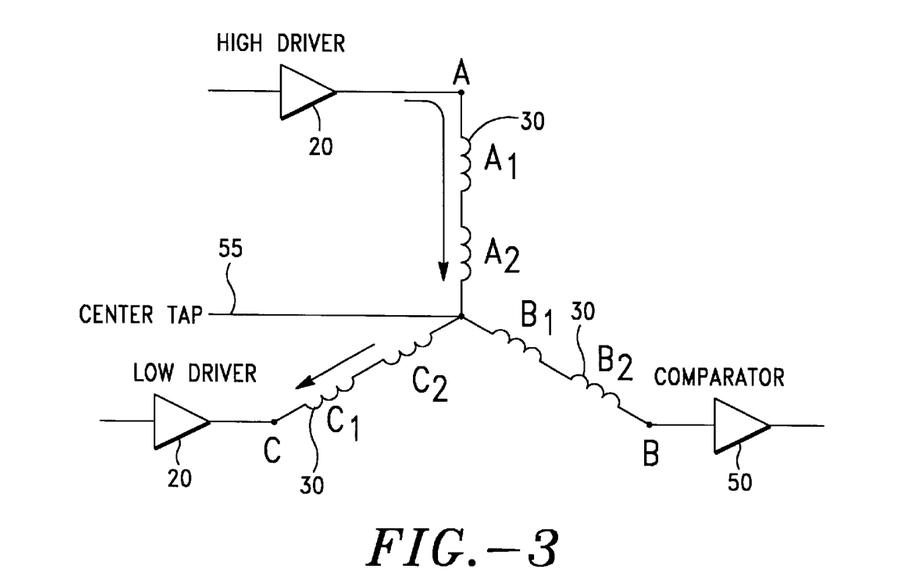
FIG. 3 shows a simplified circuit diagram of the phase windings of the spindle motor of FIG. 2.
Figure 4:
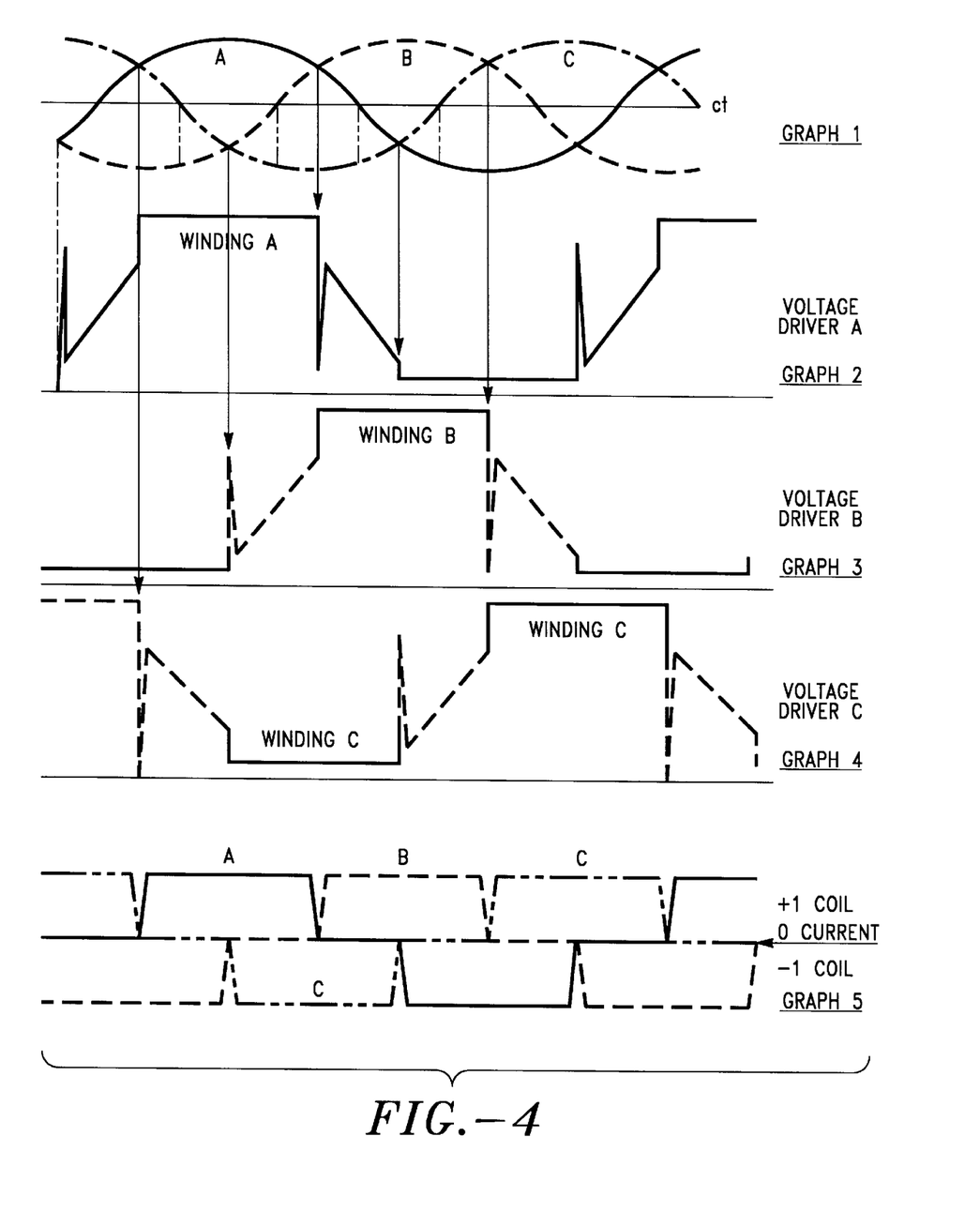
FIG. 4 shows waveforms for voltages and currents for the windings of FIG. 3.

FIG. 3 shows a simplified circuit diagram of the phase windings 30 in the motor 25 designated as A, B and C. The phase winding A comprises coils A1 and A2, the phase winding B comprises coils B1 and B2, and the phase winding C comprises coils C1 and C2. Referring to FIG. 4, Graph 1 shows timing diagram of freewheeling voltage waveforms for the windings A, B and C and their relative positions due to their respective back emf voltages when the motor driver 20 is off. The crossing of a waveform across the center tap (ct) is referred to as a zero-crossing.

Commutation of the spindle motor 25 is performed by the motor driver 20 under timing output signals from the PLL controller 10, whereby the motor driver 20 applies currents to the phase windings 30 in sequential order to generate torque-inducing flux for moving the rotor 40. Each winding 30 is electrically connected to a comparator 50 relative to a center tap (ct) 55 to provide the back emf voltage of the windings 30 to the PLL controller 10. Each winding 30 is also connected to the motor driver 20 as described above for application of current to the winding 30. FIG. 3 shows an example partial circuit connection where the windings A and C are coupled to the motor driver 20, and the unenergized winding B, coupled to the comparator 50 relative to the center tap 55, provides the back emf voltage of the winding B to the PLL controller 10 to determine the rotational position of the rotor 40.

Referring to FIG. 4, Graphs 2,3 and 4 show timing diagrams of voltage waveforms relative to the center tap 55 for the windings A, B and C, respectively, when the motor driver 20 is turned on to sequentially energize, or turn on, the windings A, B and C. The back emf volatges from unenergized or off windings 30 are utilized by the PLL controller 10 to determine the rotational position of the rotor 40 and provide a commutation timing output signal to the motor driver 20 to energize the windings 30 for application of maximum torque to the rotor 40. The motor driver 20 turns a winding 30 on in the middle of two back emf voltage zero-crossings for the winding 30. Graph 5 shows waveforms for commutation current levels flowing in the windings A, B and C corresponding to voltage waveforms in Graphs 2, 3 and 4, respectively.

Referring to FIG. 1, the PLL controller 10 comprises: (a) a charge pump 60 for generating an output current at node 65 at one or more current levels in response to input control signals at nodes 70 and 75; (b) a capacitor means 80 coupled to the charge pump 60 for receiving the output current from the charge pump 60 and generating a reference voltage at node 90 at a voltage level relative to the amount of charge stored in the capacitor means 80; (c) a phase detector 95 electrically connected to the charge pump 60 and to the motor windings 30, for receiving back emf voltage signals relative to the center tap 55 from one or more windings 30, detecting a rotational position of the rotor 40 relative to the windings 30, and generating a phase control signal at node 75 to cause the charge pump 60 to generate the output current at a current level as a function of the rotational position of the rotor 40; and (d) a VCO 105 coupled to the capacitor means 80 for generating the timing output signal at node 110 at output frequencies as a function of the voltage level of said reference voltage at node 90.

Figure 5:
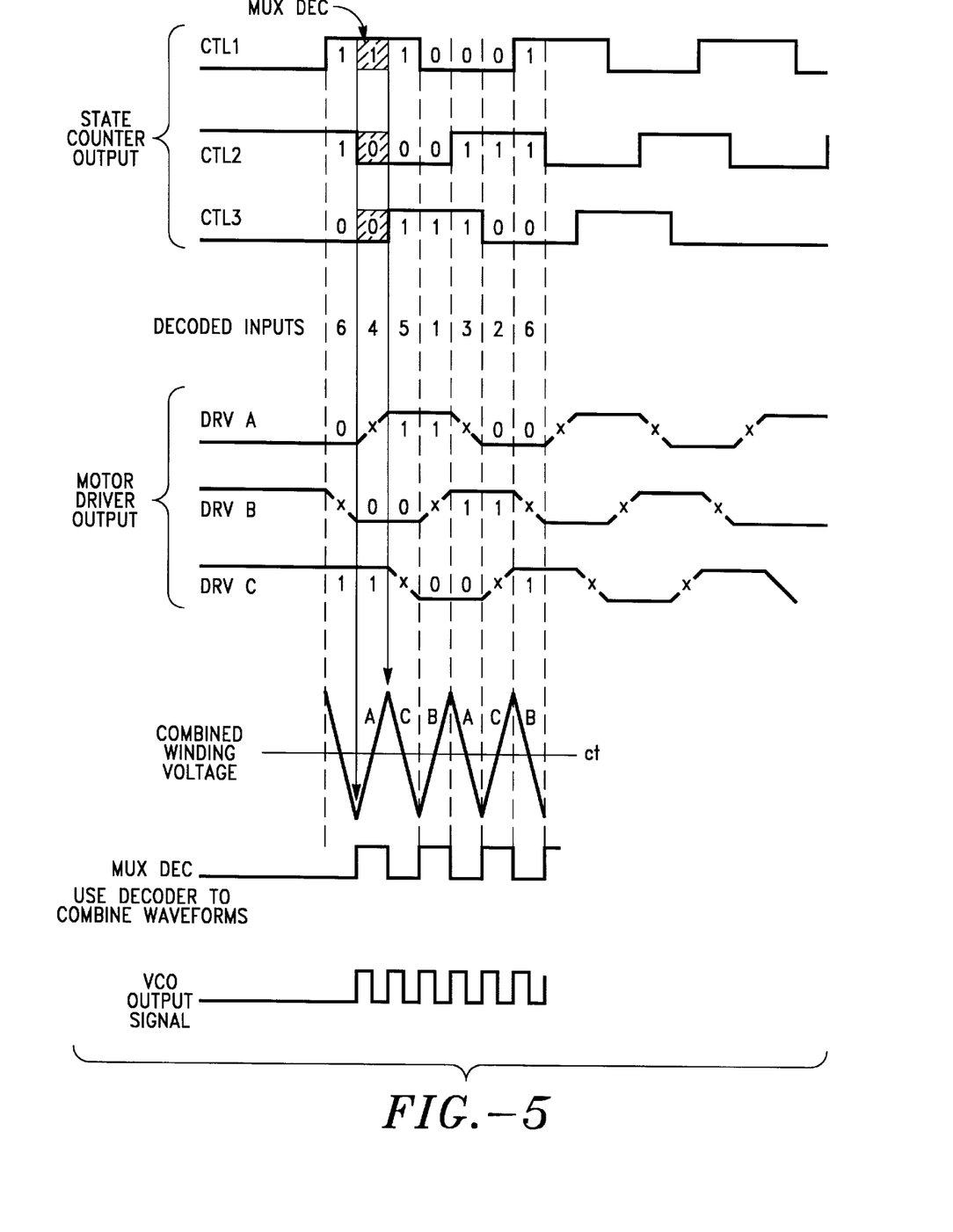
FIG. 5 shows waveforms for sequencing back emf voltages from the motor windings to the phase lock loop controller of FIG. 1.

FIG. 5 shows the VCO output signal coupled to a state counter 120 to generate three control signals CTL1, CTL2, and CTL3. Said state counter control signals are coupled to the motor driver 20 to commutate the windings 30. As shown in FIG. 5, the state counter 120 provides, in sequence, six different states for the motor driver 20 to energize the six coils A1, A2, B1, B2, C1 and C2 for each electrical cycle of the motor 25. Each state can be used to predict whether each coils is off, high or low according to the driver output waveforms DRVA, DRVB and DRVC shown in FIG. 5. The control signals of the state counter 120 are coupled to a decoder-selector 125 to combine the winding waveforms wherein the decoder 125 provides selection signals to a multiplexer 130 to sequence the back emf voltages to the phase detector 95. As such, only combined back emf voltages from the off windings are provided to the phase detector 95.

In operation, the multiplexer 130 sequences the back emf voltages from off windings to the phase detector 95 and the phase detector 95 converts the back emf voltages to phase control signals at node 75 which cause the charge pump 60 to charge and discharge the capacitor means 80 according to whether the back emf voltages are above or below the center tap 55. In effect, the back cmf voltages from the off windings are integrated relative to the center tap 55. The charge in the capacitor means 80 develops the reference voltage at node 90 which is coupled to the VCO 105 at node 90. The VCO 105 generates the timing output signal at node 110 at frequencies that are a function of the reference voltage as shown in FIG. 5. The timing output signal controls commutation timing of the motor 25 as well as the timing of the phase detector 95 to balance the phasing of the windings 30. If the rotational frequency of the rotor is not in phase with the commutation frequency, the phase detector 95 increases the reference voltage at node 90 to the VCO 105 to align the commutation timing with the motor frequency. As such, the multiplexer 130 processes the back emf voltages from the windings through the phase detector 95. The reference voltage at node 90 drives the VCO 105 to generate the timing output signal at a frequency which provides an equilibrium balance through the multiplexer 130 whereby the charge and discharge cycles at the capacitor means 80 are equal. The phase detector 95 minimizes a phase difference between the frequency of the VCO tining output signals at node 110 and the rotational frequency of the motor 25.

Figure 6:
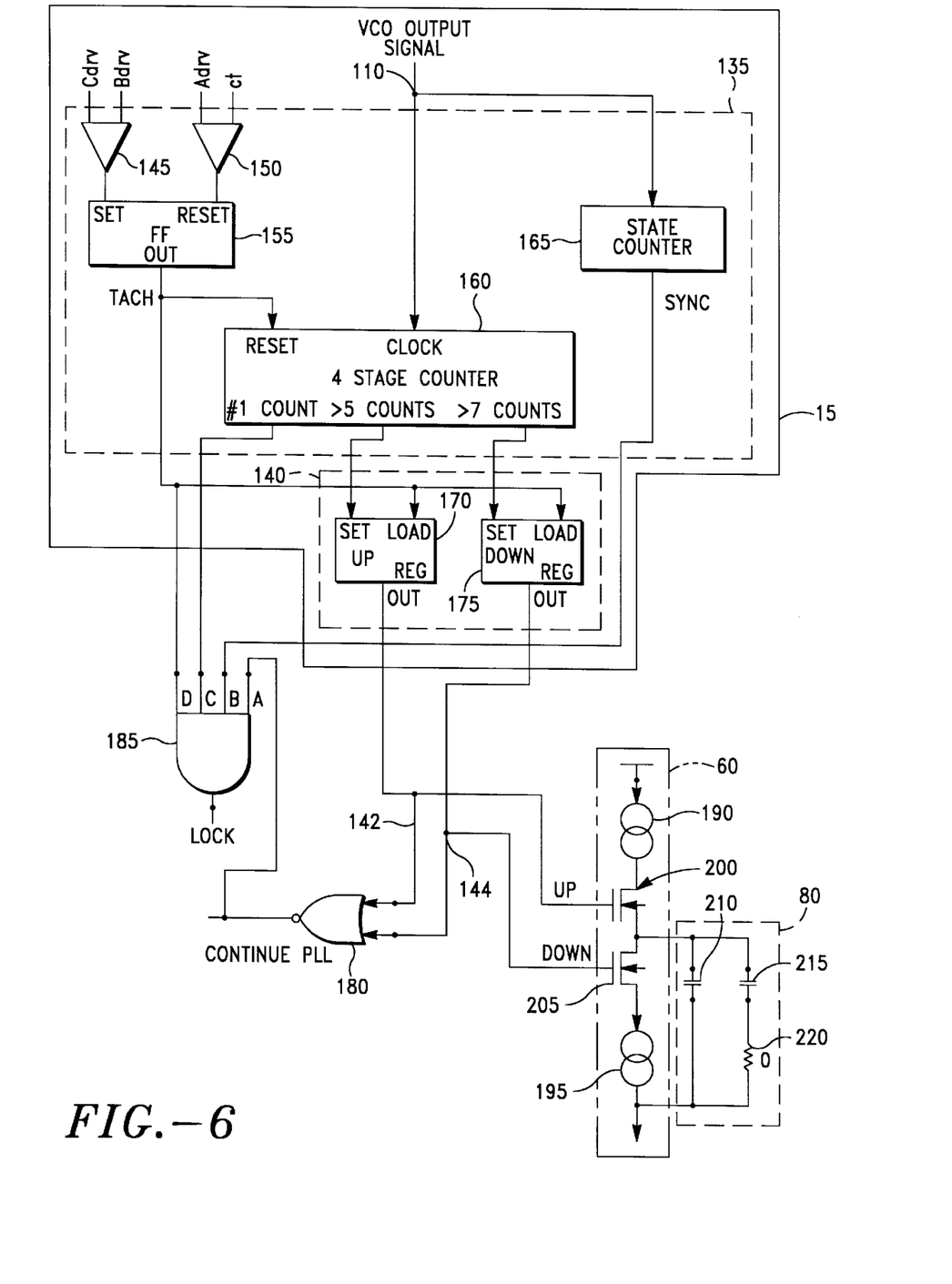
FIG. 6 shows an example circuit diagram of an embodiment of a frequency detector according to the present invention.

Referring to FIG. 6, the frequency detector 15 is coupled to the charge pump 60 and is electrically connected to the VCO timing output signal at node 110, to the motor drivers Adrv, Bdrv and Cdrv and the center tap 55. The frequency detector 15 comprises a monitor 135 for detecting a number of pulses in the VCO timing output signal during a time period between a first and a second rotational position of the rotor 40 relative to the windings 30, and a governor 140 for generating the frequency control signal at nodes 142, 144 to cause the charge pump 60 to generate an output current level as function of said number of pulses. The frequency detector 15 generates the frequency control signal to cause the charge pump 60 to charge or discharge the capacitor means 80 in order to maintain the detected number of pulses in the VCO output signal within a predefined range, thereby minimizing a difference between the frequency of the VCO timing output signal and a corresponding rotational frequency of the rotor 40 in minimum time.

The monitor 135 includes a pair of comparators 145, 150, a flip-flop 155, a 4-stage counter 160 and a state counter 165, and the governor 140 includes an up-register 170 and a down-register 175 for driving the charge pump 60, interconnected as shown and described below. Driver output signals Adrv, Bdrv and Cdrv for the windings A, B, C, respectively, and the center tap signal (ct), are coupled to the comparators 145, 150, wherein the Adrv and Bdrv signals are input to the first comparator 145 and the Cdrv and center tap signals are input to the second comparator 150. The output of the comparators 145, 150 are coupled to the flip flop 155, wherein the output from the first comparator 145 sets the flip-flop 155 and the output from the second comparator 150 resets the flip-flop 155. The output of the flip-flop 155, designated as the Tach pulse signal, marks the beginning of an electrical cycle of the motor 25 and is a measure of the mechanical rotation of the rotor 40. Typically, in an eight pole motor there are four Tach pulses per mechanical revolution of the rotor 40. The Fach pulse signal together with the VCO timing output signal are coupled to the 4-stage counter 160, wherein the fach pulse signal resets the 4-stage counter 160 and the VCO timing output signal clocks the 4-stage counter 160 to advance a pulse count therein.

At the beginning of an electrical cycle of the motor 25, the Tach pulse resets the 4-stage counter 160. The pulses in the VCO timing output signal advance the 4-stage counter 160 until the counter 160 is again reset by the next Tach pulse. As such, the 4-stage counter 160 counts the number of pulses in the VCO timing output signal between two Tach pulses. The 4-stage counter 160 provides three output signals: A first signal for indicating if the number of counted pulses are seven or greater, a second signal for indicating if the number of counted pulses are five or less, and a third signal indicating a first pulse count.

The first output signal from the 4-stage counter 160 is coupled to the down-register 175 to enable the down-register 175 when the count of pulses is greater than six. The output of the down-register 175 is coupled to the charge pump 60, and when enabled, the down-register 175 causes the charge pump 60 to discharge the capacitor means 80 to reduce the reference voltage at node 90, whereby the VCO 105 reduces the number of pulses in the timing output signal. The down-register 175 remains enabled so long as the pulse count is seven or greater, while the up-register 170 remains disabled. The second output signal from the 4-stage counter 160 is coupled to the up-register 170 to enable the up-register 170 when the count of pulses is less than six. The output of the up-register 170 is coupled to the charge pump 60, and when enabled, the up-register 170 causes the charge pump 60 to charge the capacitor means to increase the reference voltage at node 90, whereby the VCO 105 increases the number of pulses in the timing output signal. The up-register 170 remains enabled so long as the pulse count is five or less, while the down-register 175 remains disabled.

Figure 7:
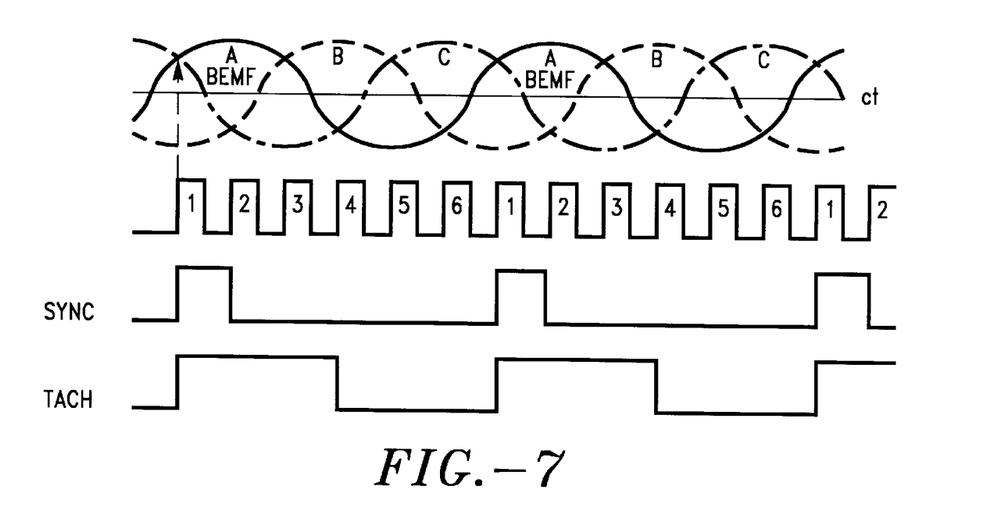
FIG. 7 shows the relationship between example waveforms for the motor winding back emf voltages and commutation timing signals under the control of the PLL controller of FIG. 1.

The VCO timing output signal advances the state counter 165 which generates a Sync pulse signal to mark the beginning of a commutation cycle of the motor 25. FIG. 7 shows a timing diagram of corresponding waveforms for the winding back emf voltages the VCO timing output signal the Sync pulse signal and the Tach pulse signal. When the motor and commutation frequencies are the same, there are six pulses in the VCO timing output signal per one cycle of the Fach signal. There is one Tach pulse per Sync pulse, and when the rising edges of the Tach and Sync pulses occur together, the commutation and motor frequencies are at the same frequency and close to the same phase, and the frequency detector 15 "hands over" the commutation timing to the phase detector 95.

The hand over feature can be implemented by the coupling the output signals of the up-register 170 and the down-register 175 to a NOR gate 180 to generate an output mode signal having a high state (phase detection state), and a low state (frequency detection state), where the mode signal is in the high state when neither the up-register 170 nor the down-register 175 are enabled, indicating six VCO output pulses per Tach cycle. The mode signal can be used to enable the phase detector 95 and disable the frequency detector 15 when the mode signal is in the high state. Therefore, when the mode signal in the low state, the frequency detector 15 controls the frequency of the VCO timing output signal, and when the mode signal is in the high state, the phase detector 95 controls the frequency of the VCO timing output signal. As such, the determination for switching to the phase detector 95 is reached in minimum time by a fractional (⅙th) Tach cycle of any misalignment of the Sync and Tach pulses for all motor frequencies. In this manner, the phase detector 95 takes control of commutations when the motor and commutation frequencies are the same, regardless of the motor frequency.

The frequency detector 15 can further comprise means for generating a Lock signal indicating that the Tach and Sync signals are aligned, and the motor and commutation frequencies are in phase. This feature is implemented by coupling the Tach signal, the Sync signal, the mode signal and the third output signal of the 4-stage counter 160 to an AND gate 185. The output of the AND gate 185 represents the Lock signal, and can be used, for example, to turn the motor driver 20 on to actively energize the windings 30 for the motor 25 to reach its operational speed.

Figure 8:
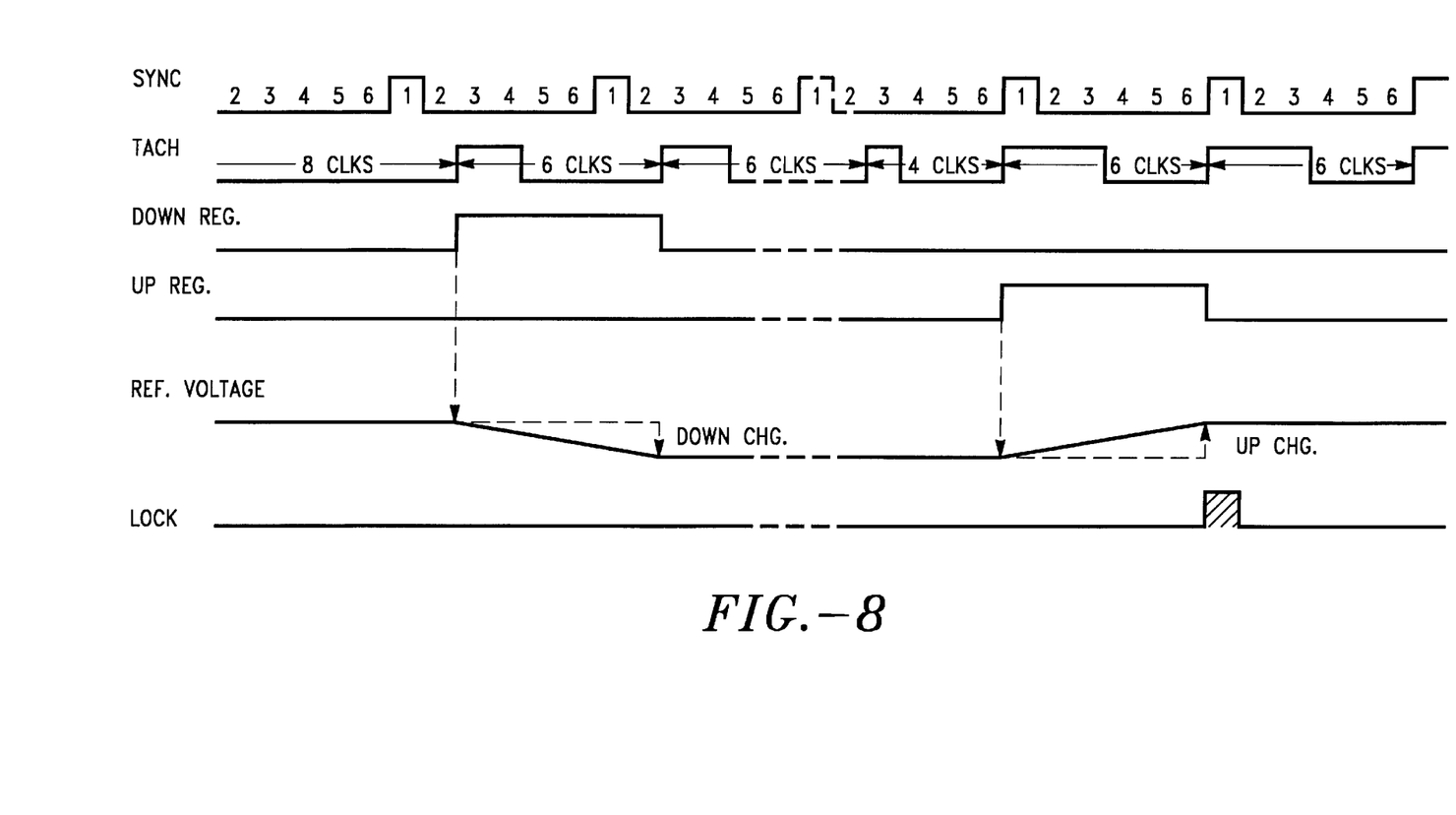
FIG. 8 shows the relationship between example waveforms for misaligned commutation and motor timing as corrected by the frequency detector of FIG. 6.

FIG. 8 shows an example timing diagram of waveforms for the Sync pulse signal, the Tach pulse signal, the output signal of the down register 175, the output signal of the up-register 170, the reference voltage level at node 90 and the Lock signal. In this example, the Sync and Tach signals are initially misaligned, wherein the number of pulses in the VCO output signal is initially eight pulses per Tach cycle. Upon detecting eight VCO output pulses per Tach signal cycle, the down-register 175 is enabled wherein the charge pump 60 discharges the capacitor means 80 and decreases the reference voltage, thereby causing the VCO 105 to decrease the number of pulses in the timing output signal to six per Tach cycle. The down-register 175 is then disabled. Thereafter, the number of pulses in the VCO output signal decreases to four pulses per Tach cycle. Upon detecting four VCO output pulses per Tach cycle, the up-register 170 is enabled wherein the charge pump 60 charges the capacitor means 80 and increases the reference voltage, thereby causing the VCO 105 to increase the number of pulse in the timing output signal to six pulses per Tach cycle. The up-register 170 is then disabled. When the Sync and Tach pulses occur at the same time and the number of pulses in the VCO timing output signal remains at six pulses per Tach cycle, the frequency detector 15 generates a lock signal and hands over the commutation timing to the phase detector 95 as described above.

FIG. 6 shows example embodiments of the charge pump 60 and the capacitor means 80. The charge pump 60 comprises a current source 190 and a current sink 195 interconnected to the capacitor means 80 via an up-transistor switch 200 and a down-transistor switch 205, respectively. The output of the up-register 170 is coupled to the gate of up-transistor 200 switch to enable flow of current from the current source 190 to the capacitor means 80 through the switch 200 to charge the capacitor means 80 when the up-register 170 is enabled. The output of the down-register 175 is coupled to the gate of down-transistor switch 205 to enable flow of current from the capacitor means 80 to the current sink 195 through the switch 205 to discharge the capacitor means 80 when the down-register 175 is enabled. The capacitor means 80 comprises a first capacitor 210 connected in parallel with a series connection of a second capacitor 215 and a resistor 220. The series combinations of the capacitor 215 and the resistor 220 can be utilized as a filter to control the bandwidth of the PLL controller.

In one example application, a PLL controller 10 according to the present invention can be reliably used to "hot start" the spindle motor 25 after loss of power for all motor speeds. When there is a power interruption, the motor 25 enters a "coast" mode wherein the inertial momentum of the rotor 40 keeps the rotor 40 spinning until friction or breaking bring the rotor to a stop. Due to the power loss, the phase detector 95 in the PLL controller 10 can lose track of the motor frequency and must rely on the frequency detector 15 to detect the proper motor frequency before the phase detector 95 can take over and commutate the motor 25 back to its operational speed. The frequency detector 15 can be enabled via an external run/coast signal when the motor is in the coast mode and then hands over commutation timing to the phase detector 95 as described above. Due to the extensive dynamic range of the frequency detector 15 of the present invention, the PLL controller 10 commutates the motor 25 back to its operational speed in minimum time for the full range of frequencies which the motor 25 can experience.

Figure 9:
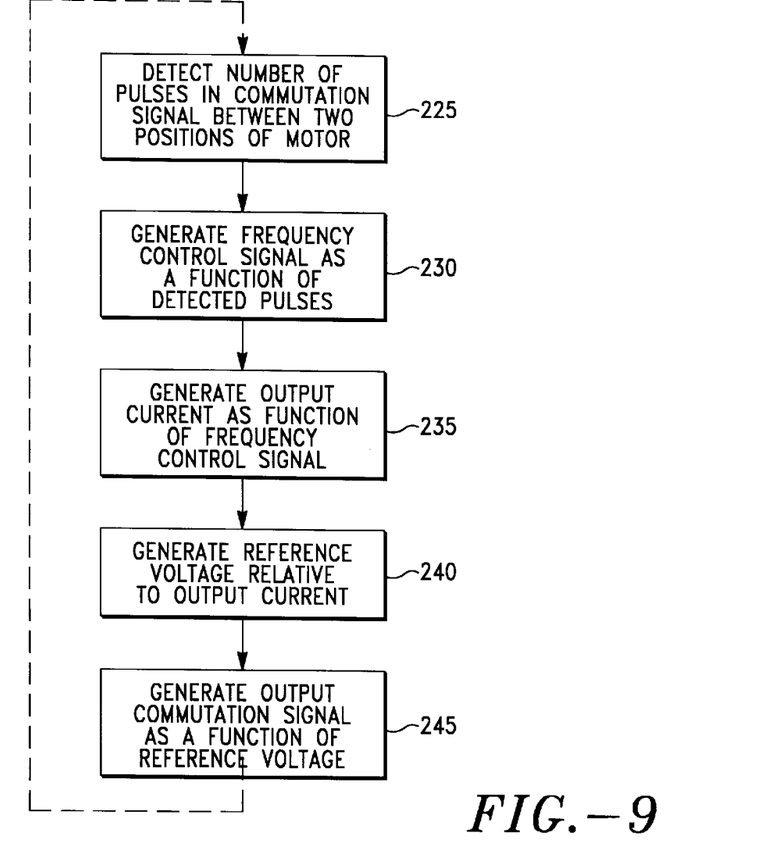
FIG. 9 shows an embodiment of a flow diagram of the steps of a method of frequency detection according to another aspect of the present invention.

In another aspect, the present invention provides a method of controlling the frequency of an output signal provided by a PLL controller to a motor driver for commutating a spindle motor. Referring to FIG. 9, a flow diagram of an example embodiment of the method of the present invention comprises the steps of, (a) detecting a number of pulses in said output signal during a time period between a first and a second rotational position of the rotor relative to the windings (step 225), (b) generating a frequency control signal as function of said number of pulses (step 230), and (c) generating said output signal at output frequencies selectively as a function of said frequency control signal, whereby the frequency control signal minimizes a phase difference between the frequency of the output signal and a corresponding rotational frequency of the rotor. Generating said output signal can comprise: (i) generating an output current at one or more current levels in response to said frequency control signal (step 235), (ii) generating a reference voltage at a voltage level relative to the current level of said output current (step 240), and (iii) generating said output signal at output frequencies as a function of the voltage level of said reference voltage (step 245).

Steps 230 above can further comprise generating the frequency control signal to maintain said number of pulses in the output signal within a predefined range, thereby minimizing a difference between the frequency of the output signal and a corresponding rotational frequency of the rotor. Step 230 can further comprise toggling a mode signal, having a phase state and a frequency state, to the phase state when said number of pulses in the output signal is within said predefined range. The method of the present invention can further comprise the step of detecting a rotational position of the rotor relative to the windings and providing the phase control signal as a function of said rotational position of the rotor when the mode signal is in the phase state. As such, the step of generating said output signal comprises generating said output signal at output frequencies selectively as a function of said frequency control signal when the mode signal in the frequency state, or as a function of said phase control signal when the mode signal in the phase state.

In another aspect of the present invention, the method of the present invention can be used to program a logic circuit or Application Specific Integrated Circuit (ASIC) to perform the steps of the method of the present invention to interact with the motor driver 20 and the spindle motor 25. Alternatively, the steps of the method of the present invention can be used to program a computer system including a CPU, ROM and RAM to interact with the motor driver 20 and the spindle motor 25 as described above.

Although the present invention has been described in considerable detail with regard to preferred versions thereof, other versions are possible. Therefore, the appended claims should not be limited to the descriptions of the preferred versions contained herein.

What is claimed is:

1. A frequency detector for a PLL controller, the PLL controller being for generating an output signal to control a motor driver electrically connected to a motor having multiple phase windings arranged as a stator and a rotor having a permanent magnet or a DC current excitation winding for rotating the rotor, the motor driver selectively establishing current paths through selected windings in response to said output signal, to provide maximum torque to the rotor based on the rotational position of the rotor relative to the windings, the frequency detector comprising a monitor for detecting a number of pulses in said output signal during a time period between a first and a second rotational position of the rotor relative to the windings, and a governor for generating a frequency control signal as a function of said number of pulses, wherein the PLL controller generates said output signal at output frequencies selectively as a function of said frequency control signal, whereby the frequency detector minimizes a difference between the frequency of the output signal and a corresponding rotational frequency of the rotor.

2. The frequency detector of claim 1 wherein the frequency detector generates the frequency control signal to maintain said number of pulses in the output signal within a predefined range, thereby minimizing a difference between the frequency of the output signal and a corresponding rotational frequency of the rotor.

3. The frequency detector of claim 2, wherein said first and second rotational positions of the rotor define an electrical cycle of the motor.

4. The frequency detector of claim 3, wherein the motor has four electrical cycles per mechanical revolution of the rotor and wherein said predefined range is from five to seven pulses.

5. The frequency detector of claim 1, wherein:

(a) the PLL controller includes a phase detector for detecting a rotational position of the rotor relative to the windings and generating a phase control signal as a function of said rotational position of the rotor, wherein the PLL controller generates said output signal at output frequencies selectively as a function of said phase control signal, whereby the phase detector minimizes a phase difference between the frequency of the output signal and a corresponding rotational frequency of the rotor, (b) the frequency detector is further responsive to a mode signal having a frequency state and a phase state wherein the frequency detector generates the frequency control signal when the mode signal is in the frequency state, and (c) the phase detector is further responsive to said mode signal wherein the phase detector generates the phase control signal when the mode signal is in the phase state.

6. The frequency detector of claim 5, wherein:

(a) the frequency detector generates the frequency control signal to maintain said number of pulses in the output signal within a predefined range thereby minimizing a difference between the frequency of the output signal and a corresponding rotational frequency of the rotor, and (b) the frequency detector includes means for toggling said mode signal to the phase state when said number of pulses in the output signal is within said predefined range.

7. The frequency detector of claim 6, wherein the PLL controller includes means for toggling said mode signal to the frequency state when the motor enters a coast mode.

8. A PLL controller for generating an output signal to control a motor driver electrically connected to a motor having multiple phase windings arranged as a stator and a rotor having a permanent magnet or a DC current excitation winding for rotating the rotor, the motor driver selectively establishing current paths through selected windings in response to said output signal, to provide maximum torque to the rotor based on the rotational position of the rotor relative to the windings, the PLL controller comprising:

(a) a charge pump for generating an output current at one or more current levels in response to input control signals;

(b) a capacitor means coupled to the charge pump for receiving said output current and generating a reference voltage at a voltage level relative to amount of charge stored in the capacitor means;

(c) a phase detector coupled to the charge pump and responsive to back emf voltage in one or more windings for detecting a rotational position of the rotor relative to the windings and providing a phase control signal to cause the charge pump to generate said output current at a current level as a function of said rotational position of the rotor;

(d) a voltage controlled oscillator coupled to the capacitor means for generating said output signal at output frequencies as a function of the voltage level of said reference voltage; and (e) a frequency detector coupled to the charge pump and responsive to back emf voltages in the windings and to said output signal, the frequency detector comprising a monitor for detecting a number of pulses in said output signal during a time period between a first and a second rotational position of the rotor relative to the windings, and a governor for generating a frequency control signal to cause the charge pump to generate said output current at a current level as function of said number of pulses.

9. The PLL controller of claim 8, wherein the frequency detector generates the frequency control signal to cause the charge pump to charge or discharge the capacitor means in order to maintain said number of pulses in the output signal within a predefined range, thereby minimizing a difference between the frequency of the output signal and a corresponding rotational frequency of the rotor.

10. The PLL controller of claim 9, wherein said first and second rotational positions of the rotor define an electrical cycle of the motor.

11. The PLL controller of claim 10, wherein the motor has four electrical cycles per mechanical revolution of the rotor and wherein said predefined range is from five to seven pulses.

12. The PLL controller of claim 8, wherein:

(a) the phase detector is further responsive to a mode signal having a frequency state and a phase state, wherein the phase detector generates the phase control signal when the mode signal is in the phase state; and (b) the frequency detector is further responsive to said mode signal wherein the frequency detector generates the frequency control signal when the mode signal is in the frequency state;

whereby, (1) when the mode signal is in the phase state, the phase detector can regulate the frequency of said output signal by controlling said reference voltage via charging and discharging of the capacitor means through the charge pump, and (2) when the mode signal is in the frequency state, the frequency detector can regulate the frequency of said output signal by controlling said reference voltage via charging and discharging of the capacitor means through the charge pump.

13. The PLL controller of claim 12, wherein:

(a) the frequency detector generates the frequency control signal to cause the charge pump to charge or discharge the capacitor means in order to maintain said number of pulses in the output signal within a predefined range, thereby minimizing a difference between the frequency of the output signal and a corresponding rotational frequency of the rotor, and (b) the frequency detector includes means for toggling said mode signal to the phase state when said number of pulses in the output signal is within said predefined range.

14. The PLL controller of claim 13 further comprising means for toggling said mode signal to the frequency state when the motor enters a coast mode.

15. The PLL controller of claim 8, wherein the phase detector generates the phase control signal to cause the charge pump to charge or discharge the capacitor means, thereby minimizing a phase difference between the frequency of the output signal and a corresponding rotational frequency of the rotor.

16. In a PLL controller for generating an output signal to control a motor driver electrically connected to a motor having multiple phase windings arranged as a stator and a rotor having a permanent magnet or a DC current excitation winding for rotating the rotor, the motor driver selectively establishing current paths through selected windings in response to said output signal, to provide maximum torque to the rotor based on the rotational position of the rotor relative to the windings, a method of controlling a frequency of said output signal comprising the steps of:

(a) detecting a number of pulses in said output signal during a time period between a first and a second rotational position of the rotor relative to the windings, and generating a frequency control signal as function of said number of pulses; and (b) generating said output signal at output frequencies selectively as a function of said frequency control signal.

17. The method of claim 16 wherein step (b) comprises the steps of:

(i) generating an output current at one or more current levels in response to said frequency control signal;

(ii) generating a reference voltage at a voltage level relative to the current level of said output current; and (iii) generating said output signal at output frequencies as a function of the voltage level of said reference voltage.

18. The method of claim 16, wherein the step of generating the frequency control signal comprises generating the frequency control signal to maintain said number of pulses in the output signal within a predefined range, thereby minimizing a difference between the frequency of the output signal and a corresponding rotational frequency of the rotor.

19. The method of claim 18, wherein said first and second rotational positions of the rotor define an electrical cycle of the motor.

20. The method of claim 19, wherein the motor has four electrical cycles per mechanical revolution of the rotor and wherein said predefined range is from five to seven pulses.

21. The method of claim 16, further comprising the steps of generating the frequency control signal further in response to a mode signal having a frequency state and a phase state, wherein the frequency control signal is generated when the mode signal is in the frequency state.

22. The method of claim 21, further comprising the steps of: (i) generating the frequency control signal to maintain said number of pulses in the output signal within a predefined range, thereby minimizing a difference between the frequency of the output signal and a corresponding rotational frequency of the rotor, and (ii) toggling said mode signal to the phase state when said number of pulses in the output signal is within said predefined range.

23. The method of claim 16, further comprising the step of detecting a rotational position of the rotor relative to the windings and providing a phase control signal as a function of said rotational position of the rotor, wherein step of generating said output signal further comprises generating said output signal at output frequencies selectively as a function of said frequency control signal or said phase control signal.

24. The method of claim 23, wherein the step generating said output signal comprises the steps of:
(i) generating an output current at one or more current levels selectively in response to said frequency control signal or said phase control signal;
(ii) generating a reference voltage at a voltage level relative to the current level of said output current; and
(iii) generating said output signal at output frequencies as a function of the voltage level of said reference voltage.

25. The method of claim 23, further comprising the steps of: (i) generating the frequency control signal further in response to a mode signal, having a frequency state and a phase state when the mode signal in the frequency state and (ii) generating the phase control signal further in response to said mode signal when the mode signal in the phase state.

26. The method of claim 24, further comprising the steps of (i) generating the frequency control signal to maintain said number of pulses in the output signal within a predefined range thereby minimizing a difference between the frequency of the output signal and a corresponding rotational frequency of the rotor, and (ii) toggling said mode signal to the phase state when said number of pulses in the output signal is within said predefined range.

27. The method of claim 16, wherein the step of generating the phase control signal comprises generating the phase control signal to minimize a phase difference between the frequency of the output signal and a corresponding rotational frequency of the rotor.

* * * * *